(12) United States Patent
Cheng

(10) Patent No.: US 8,780,930 B2
(45) Date of Patent: *Jul. 15, 2014

(54) SYSTEM AND METHOD FOR REMOVING PDCCH DETECTION ERRORS IN A TELECOMMUNICATIONS NETWORK

(75) Inventor: Jung-Fu Cheng, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 83 days.

This patent is subject to a terminal disclaimer.

(21) Appl. No.: 13/472,389

(22) Filed: May 15, 2012

(65) Prior Publication Data

US 2012/0230275 A1    Sep. 13, 2012

Related U.S. Application Data

(63) Continuation-in-part of application No. 12/491,581, filed on Jun. 25, 2009, now Pat. No. 8,201,031.

(60) Provisional application No. 61/090,753, filed on Aug. 21, 2008.

(51) Int. Cl.
*H04L 12/54* (2013.01)

(52) U.S. Cl.
USPC ............ 370/412; 370/328; 370/522; 714/701

(58) Field of Classification Search
None
See application file for complete search history.

(56) References Cited

U.S. PATENT DOCUMENTS

| | | | |
|---|---|---|---|
| 7,869,402 B2 | 1/2011 | Yoon et al. | |
| 7,940,795 B2 | 5/2011 | Frederiksen et al. | |
| 7,986,741 B2 | 7/2011 | Tsai et al. | |
| 8,121,218 B2 | 2/2012 | Kwon et al. | |
| 8,201,031 B2 * | 6/2012 | Cheng | 714/701 |
| 2008/0313521 A1 | 12/2008 | Frederiksen et al. | |
| 2009/0028129 A1 * | 1/2009 | Pi et al. | 370/351 |
| 2009/0041110 A1 | 2/2009 | Malladi | |
| 2009/0067378 A1 | 3/2009 | Luo et al. | |
| 2009/0257449 A1 * | 10/2009 | Chen et al. | 370/470 |
| 2010/0050059 A1 | 2/2010 | Cheng | |

OTHER PUBLICATIONS

Samsung et al., "Circular buffer rate matching for LTE", RI-072245, 3rd Generation Partnership Project (3GPP); Technical Specification Group (TSG) Radio Access Network (RAN); Working Group 1 (WG1), #49 Kobe, Japan, No. R1-072245, May 7, 2007, pp. 1-3, XP002504205.

* cited by examiner

*Primary Examiner* — Donald Mills (57) ABSTRACT

A system, method and node for unambiguous encoding of Physical Downlink Control Channel (PDCCH) channels in a Long Term Evolution (LTE) telecommunications system to remove detection errors. The method includes modifying a size of a circular buffer where the coded bits are collected to avoid repetition of the coded bits in consecutive subset of the control channel elements allocated to the PDCCH. The size of the circular buffer is selected so that it is not equal to the number of coded bits output from the encoder. Coded bits can be deleted from or added to the coded bit sequence depending on the size of the circular buffer.

18 Claims, 5 Drawing Sheets

SYSTEM AND METHOD FOR REMOVING PDCCH DETECTION ERRORS IN A TELECOMMUNICATIONS NETWORK

RELATED APPLICATIONS

This continuation-in-part application claims the benefit of U.S. patent application Ser. No. 12/491,581 filed Jun. 25, 2009 now U.S. Pat. No. 8,201,031, and U.S. Provisional Application 61/090,753 filed Aug. 21, 2008, which are incorporated herein by reference.

TECHNICAL FIELD

The present invention relates to communications networks. More particularly, and not by way of limitation, the present invention is directed to a system and method for removing Physical Downlink Control Channel (PDCCH) detection errors in a Long Term Evolution (LTE) telecommunications system.

BACKGROUND

Figure 1:
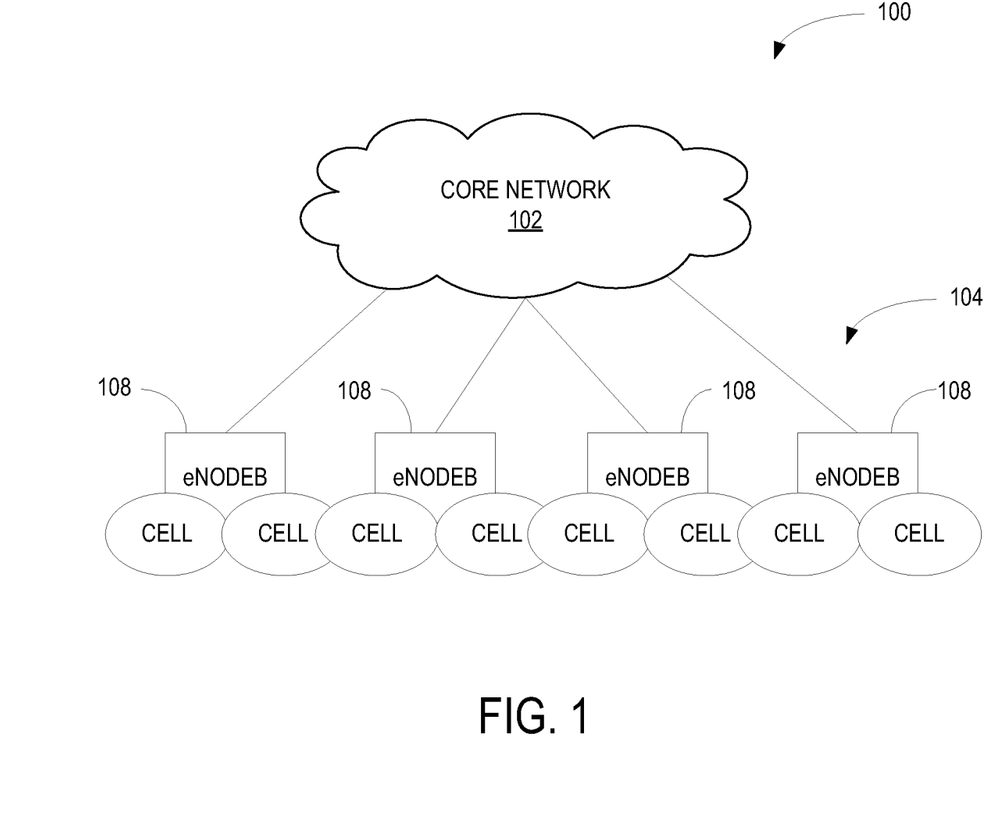
FIG. 1 (prior art) illustrates a simplified block diagram of a UMTS network.

FIG. 1 illustrates a simplified block diagram of an LTE network 100. The LTE network 100 comprises a core network 102 and a radio access network (RAN) 104. The RAN 104 comprises a plurality of access nodes, which are commonly referred to a evolved NodeBs (eNodeBs) 108, providing service to user equipments (UEs) 110 in respective cells of the LTE network 100. The eNodeBs 108 communicate with the UEs 110 over the air interface and provide connection to the core network 102. Although the present invention is described in the context of an LTE network, those skilled in the art will appreciate that the invention can be used in other communication networks based on the communication standards, including without limitation Wideband Code Division Multiple Access (WCDMA) networks.

In an LTE system, PDCCHs are transmitted over radio resources that are shared between several UEs. The UE is specified as having to monitor four aggregation levels, specifically, 1, 2, 4, and 8, for a UE-specific search space and two aggregation levels, specifically, 4 and 8, for a common search space.

Third Generation Partnership Project (3GPP) Technical Specification (TS) 36.213 (Version 8), Section 9.1 explains the UE procedure for determining physical downlink control channel assignment. In particular, Section 9.1.1 (PDCCH assignment procedures) discusses a search space $S_k^{(L)}$ at an aggregation level L∈{1,2,4,8} which is defined by a contiguous set of Control Channel Elements (CCEs) given by $$(Z_k^{(L)}+i) \bmod N_{CCE,k} \quad (1)$$

where $N_{CCE,k}$ is the total number of CCEs in the control region of subframe k, $Z_k^{(L)}$ defines the start of the search space, i=0, 1, ..., $M^{(L)} \cdot L-1$ and $M^{(L)}$ is the number of PDCCHs to monitor in the given search space. Each CCE contains 36 Quadrature Phase Shift Keying (QPSK) modulation symbols. The value of $M^{(L)}$ is specified by Table 1 and disclosed in 3GPP TS 36.213, is shown below.

TABLE 1

$M^{(L)}$ vs. Aggregation Level

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

With this definition, search space for different aggregation levels may overlap with each other regardless of system bandwidth. Specifically, UE-specific search space and common search space may overlap. In addition, the search spaces for different aggregation levels may overlap. For example, Table 2 below illustrates an example of such an overlap. Table 2 illustrates the example where $N_{CCE,k}=9$, $Z_k^{(L)}=\{1, 6, 4, 0\}$ for L={1, 2, 4, 8}, respectively.

TABLE 2

Example of Overlapping Aggregation Levels

| Type | Search space $S_k^{(L)}$ Aggregation Level L | PDCCH candidates |
|---|---|---|
| UE-Specific | 1 | {1}, {2}, {3}, {4}, {5}, {6} |
|  | 2 | {6, 7}, {8, 0}, {1, 2}, {3, 4}, {5, 6}, {7, 8} |
|  | 4 | {4, 5, 6, 7}, {8, 0, 1, 2} |
|  | 8 | {0, 1, 2, 3, 4, 5, 6, 7}, {8, 0, 1, 2, 3, 4, 5, 6} |
| Common | 4 | {0, 1, 2, 3}, {4, 5, 6, 7}, {8, 0, 1, 2}, {3, 4, 5, 6} |
|  | 8 | {0, 1, 2, 3, 4, 5, 6, 7}, {8, 0, 1, 2, 3, 4, 5, 6} |

A PDCCH transmission employs circular buffer based rate matching for rate 1/3 Tail-biting Convolutional code. Due to repetition of coded bits and search space overlapping between different aggregation levels, multiple aggregation levels may pass the Cycle Redundancy Check (CRC) checking.

Figure 2A:
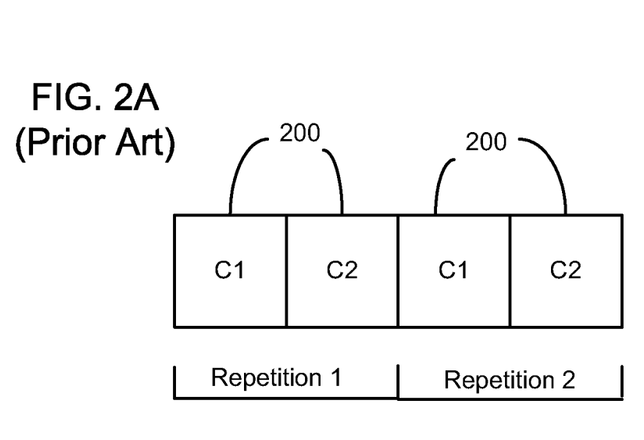
FIG. 2A (prior art) illustrates a payload having a plurality of CCEs with an aggregation size 4.
Figure 2B:
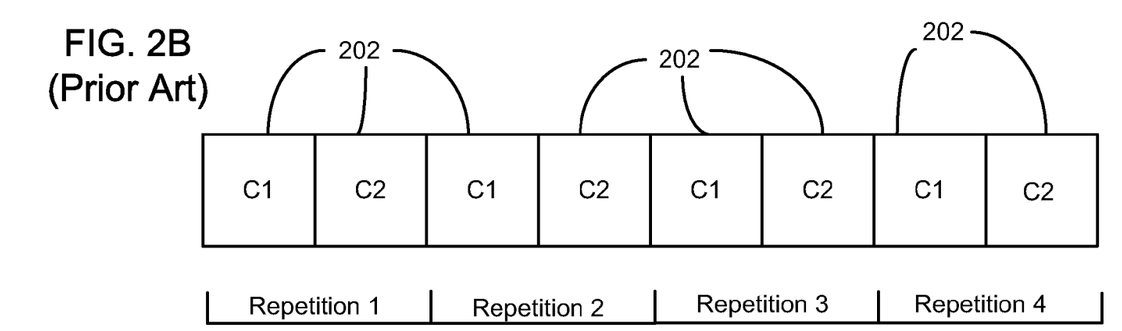
FIG. 2B (prior art) illustrates a payload with a plurality of CCEs having an aggregation size 8.

In addition, due to circular-buffer based rate matching, for a given aggregation size (2, 4 or 8), coded bits may start to repeat themselves after the 1st CCE. FIGS. 2A and 2B are simplified block diagrams illustrating CCE repetition examples in an existing telecommunications system. FIGS. 2A and 2B illustrate examples for a particular payload size (i.e., 48 bits). FIG. 2A illustrates a payload having a plurality of CCEs 200 having an aggregation size 4 with 2 repetitions. Each repetition starts at the same location in the circular buffer. FIG. 2B illustrates a payload with a plurality of CCEs 202 having an aggregation size 8. With an aggregation size of 8, there are four repetitions with each repetition starting at the same location in the circular buffer.

In general, the necessary condition to have confusing levels is shown in:

$$N \times k = 24 \times m \quad (2)$$

where N is the ambiguous payload size and m and k are both integers. Since the UE is not required to decode PDCCH with a code rate higher than 0.75, N should be no more than 54×(8−m). For example, when N=48, m=2 k, k may take a value of 1, 2, or 4. In such an example, any combination of {1,2,4,8} may create confusing (2 or more) aggregations levels. Since the LTE PDCCH payload contains information bits and the corresponding 16-bit CRC, the payload size is no less than 20 bits. An exhaustive list of all problematic sizes applicable to the LTE system is:

$$\{20,21,24,28,30,32,36,40,42,48,60,72,96,120\} \qquad (3)$$

Due to coded bits repetition and search space overlapping between different aggregation sizes, multiple aggregation sizes may pass the CRC checking. Since the $1^{st}$ CCE of the PDCCH is linked to the uplink Acknowledgement/Negative Acknowledgement (ACK/NACK) resource for dynamic scheduling, the UE may send its ACK/NACK in a different resource, which is unknown by the Node-B (i.e., multiple ACK/NACK resources are possible). As such, there may be confusion in the Uplink (UL) ACK/NAK resource location mapped from the $1^{st}$ CCE of the corresponding PDCCH grants, when two or more PDCCH decoding candidates from different aggregation levels have different lowest CCE indices. The potentially wrong UL ACK/NAK resource location not only creates unnecessary UL interference, it also impacts downlink throughput, especially for high geometry UEs.

There have been a large number of solutions to remedy these problems. In one solution, two bits are added in each PDCCH format to indicate the aggregation size. This simple solution would allow the UE to verify the correctness of the aggregation size. However, this solution increases the overhead on the PDCCH and reduces the coverage of these important system signals.

In another existing solution, for different aggregation sizes, a different CRC mask or scrambling codes is applied. This clearly increases UE decoding complexity. In addition, the additional scrambling operations for CRC (e.g., various UE identifications, Transmit antenna selection mask, and the proposal for aggregation level specific masks) lead to a higher CRC false detection probability. Thus, this solution does not address the problems associated with detection reliability.

In another existing solution, an evolved Node B (eNodeB) attempts to decode a UE's ACK/NACK at all possible locations. The eNodeB has no knowledge of whether a UE chooses the correct aggregation level for PDCCH transmission for ambiguous PDCCH payload sizes. The eNodeB may choose to detect UL ACK/NACK for a given UE on all possible aggregation levels. However, it not only creates additional implementation complexity, but, more importantly, it cannot guarantee correct detection. First, the eNodeB has to ensure no UL ACK/NAK collision is possible. This imposes a severe scheduling restriction as different UEs should not have overlapped search space. This is very difficult, if not impossible, to satisfy in reality due to system load. Moreover, the eNodeB cannot presume specific ACK/NAK statistics for certain aggregation levels due to channel conditions, a Hybrid Automatic Repeat Request (HARQ) termination target, and imperfect power control. Finally, multiple hypotheses inevitably provide a negatively impact UL ACK/NAK detection performance. Thus, it is not practical for utilizing an eNodeB to address the aforementioned problems.

To determine the actual aggregation level for a PDCCH transmission, a UE may use various approaches. The UE may use modulated symbols to determine the energy for all possible confusing combinations of CCEs. However, this approach is very unreliable because of interference from other cells. In another approach, the PDCCH may be re-encoded. The UE may decode bits to re-encode the PDCCH and determine the Signal-to-Noise Ratio (SNR) of all possible confusing combinations of CCEs. This approach is more reliable, but is very complicated. Alternately, the UE may perform a CRC check for each segment which contains an integer multiple of repetition of coded bits and an integer multiple of CCEs. There is no guarantee that each segment has the same CRC check result. Thus, complicated decision logic has to be devised. In addition, this approach inevitably increases the number of blind PDCCH decodes significantly. Thus, unless a very complicated implementation is adopted, a solution is not easily implemented. Alternatively, to bypass the above complicated implementations, the aggregation levels may be selected. For example, among all the aggregation levels with positive CRC checks, the highest or lowest aggregation level may be selected. In either case, the implementations are subject to non-negligible false alarm (of choosing the incorrect aggregation level) probability.

In another existing solution, zero padding may be applied to those PDCCH with the "troubled" payload sizes. Since, there are so many troubled payload sizes, this solution requires complicated receiver blind decoding logic.

SUMMARY

The present invention selects the size of the circular buffer to avoid any aggregation level confusion. The present invention accomplishes this unambiguous encoding of PDCCH by varying a number of coded bits in the circular buffer. The number of coded bits in the circular buffer can be varied by deleting one or more coded bits or repeating one or more bits.

In one aspect, the present invention is directed at a method of removing Physical Downlink Control Channel (PDCCH) detection errors in a Long Term Evolution (LTE) telecommunications system by unambiguous encoding. The method includes the step of modifying a size of a circular buffer by deleting or repeating at least one coded bit. The circular buffer collects interleaved bits from a PDCCH payload having a plurality of bits. The PDCCH payload is encoded with a convolutional code. The bits of the PDCCH payload are then interleaved. The interleaved bits are collected into the modified circular buffer. The bits are then selected from the modified circular buffer for transmission.

In another aspect, the present invention is directed at a system for removing PDCCH detection errors in a LTE telecommunications system with unambiguous encoding. The system includes a transmitter for transmitting a PDCCH payload having a plurality of bits and a circular buffer for collecting interleaved bits from the PDCCH payload. The size of the circular buffer is modified by deleting or repeating coded bits. The PDCCH payload is encoded with a convolutional code. The plurality of bits of the PDCCH payload are interleaved and collected into the modified circular buffer. Selected bits from the modified circular buffer are then transmitted.

In still another aspect, the present invention is directed at a node for removing PDCCH detection errors in a LTE telecommunications system by transmitting the payload with unambiguous encoding. The node modifies a size of a circular buffer by deleting or repeating coded bits. The circular buffer collects interleaved bits from a PDCCH payload having a plurality of bits. The node encodes the PDCCH payload with a convolutional code and interleaves the plurality of bits of the PDCCH payload. The node collects the interleaved bits into the modified circular buffer. The node then selects bits from the modified circular buffer for transmission.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The present invention is a system and method for removing Physical Downlink Control Channel (PDCCH) detection errors in a Long Term Evolution (LTE) telecommunications system. The PDCCH payload including information bits and appended CRC bits is encoded to generate a coded bit sequence for transmission. The coded bits are input to a circular buffer. The size of the circular buffer is selected to prevent repetition of the coded bits in consecutive subsets of the allocated control channel elements. In some embodiments, the selected size of the circular buffer is less than the number of coded bits and one or more coded bits in the coded bit sequence are deleted. In other embodiments, the selected size of the circular buffer is greater than the number of coded bits and one or more extra bits are added to the coded bit sequence.

Figure 3:
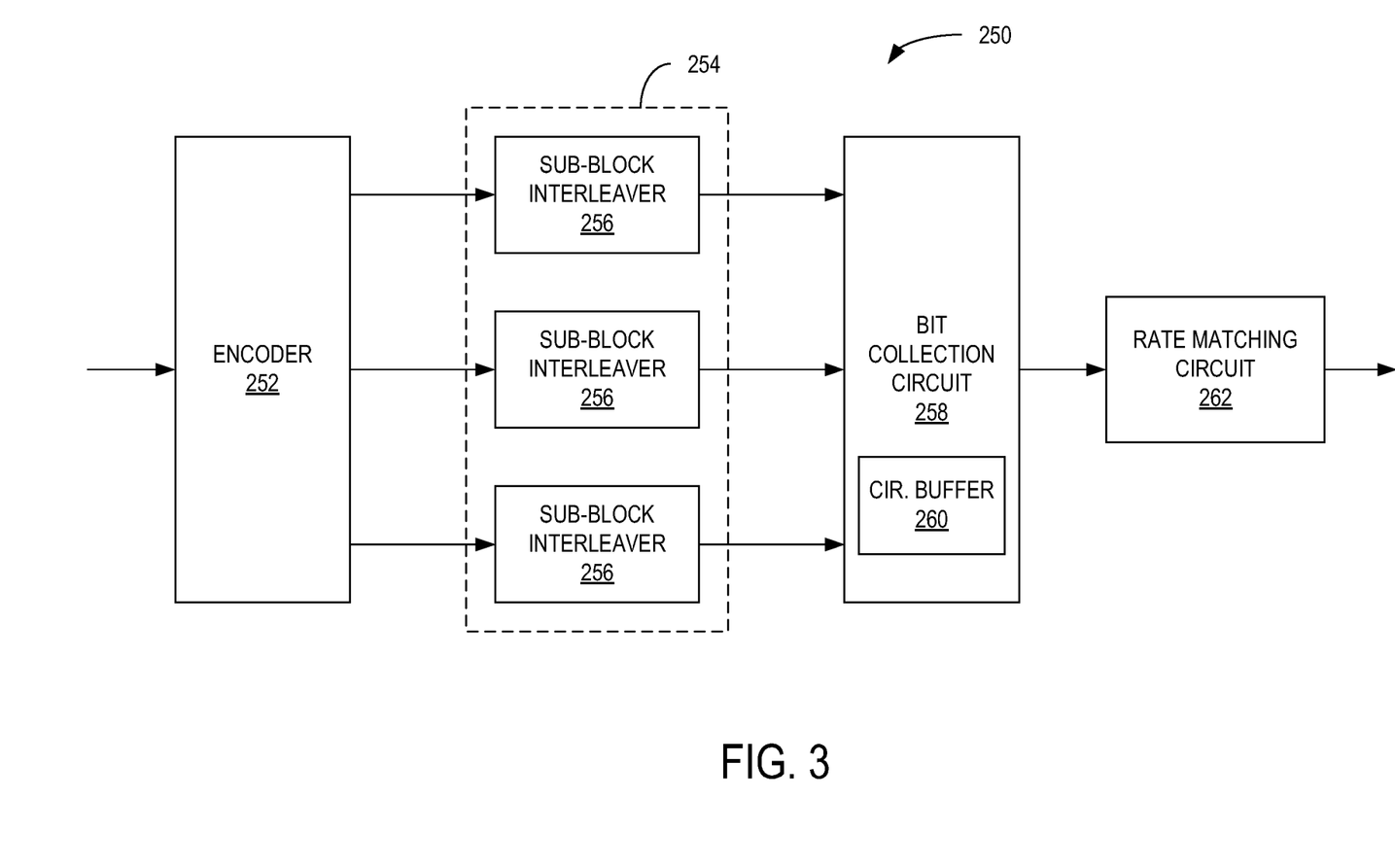
FIG. 3 is a simplified block diagram illustrating rate matching for convolutionally coded transport channels and control information.

FIG. 3 shows the main functional elements of a channel coding circuit 250 in a NodeB 108 or other transmitting node for channel coding the PDCCH. As seen in FIG. 3, the NodeB 108 comprises a encoder 252, an interleaving circuit 254, a bit collection circuit 258, and a rate matching circuit 260. The components shown in FIG. 3 may be implemented by one or more processors, hardware, firmware, or a combination thereof.

The PDCCH payload including information bits and appended CRC bits are input to the encoder 252. The encoder 252 encodes the PDCCH payload to generate a coded bit sequence. The encoder 252 may comprise, for example, a rate 1/3 convolutional encoder. Thus, with a payload size of N bits at the input of the tail-biting convolutional encoder, there are 3×N bits at the output of the encoder. Other FEC codes, such as block codes and Turbo codes could also be used.

As illustrated in FIG. 3, the coded bits output from the encoder 252 are input to the interleaving circuit 254. The function of the interleaving circuit 254 is to reorder the coded bits to increase robustness against burst errors. In one exemplary embodiment, the interleaving circuit 254 comprise a plurality of sub-block interleavers 256. The coded bit stream output by the encoder 252 is divided into multiple substreams that are input to respective sub-block interleavers 256. In FIG. 3, the substreams fed to the sub-block interleavers 256 are denoted $d_k^{(0)}$, $d_k^{(1)}$, and $d_k^{(2)}$ respectively. The sub-block interleavers 256 interleave respective bit streams $d_k^{(0)}$, $d_k^{(1)}$, and $d_k^{(2)}$ to generate the output sequences $v_k^{(0)}$, $v_k^{(1)}$, and $v_k^{(2)}$.

The bit collection circuit 258 collects the output sequences $v_k^{(0)}$, $v_k^{(1)}$, and $v_k^{(2)}$. into a circular buffer 260. In one exemplary embodiment, the output sequences are read sequentially into the circular buffer 260. The rate matching circuit 262 reads the coded bits from the circular buffer 260 to fill the control channel elements allocated to the PDCCH. If the number of transmitted bits exceeds the size of the circular buffer 260, the rate matching circuit 262 wraps to the beginning of the circular buffer 260 and continues reading out bits.

A problem occurs when the number of coded bits in the circular buffer 260 equals the numbers of bits in a subset of the control channel elements allocated to the PDCCH. In such cases, the coded bit sequence may be repeated two or more times with each repetition beginning at the same location in the circular buffer 260. In this case, the CRC may pass for two or more different aggregation levels resulting in ambiguity. For example, assume a coded bit sequence with 144 bits and an aggregation level of eight. In this example, the coded bit sequence fits exactly into four CCEs. With an aggregation level of eight, the coded bit sequence is repeated twice, which could indicate an aggregation level of either four or eight. To avoid such ambiguity, the bit collection circuit 258 is configured to select the size of the circular buffer 260 to avoid repetition of the coded bits in consecutive subsets of the control channel elements allocated to the PDCCH.

It should be noted that the convolutional encoding and rate matching algorithms as described in 3GPP TS 36.212 is generally applicable to a wide range of user data or system control information. Since the detection reliability problems arise only from the specific structure of the PDCCH, in the preferred embodiment of the present invention, minimal changes are made in the case of PDCCH payloads only. The operations described in Section 5.1.4.2.2 (Bit collection, selection and transmission) of the 3GPP TS 36.212 are modified as shown in the following examples where $K_w$ is the length of the coded bit sequence output by the encoder 252, and $K_\Pi$ is the length of the substreams output by the sub-block interleavers 256.

In a first embodiment of the inventions, a circular buffer of length $K_w = 3K_\Pi$ is generated as follows by the bit collection circuit 258:

$$w_k = v_k^{(0)}, \text{ for } k=0,\ldots,K_\Pi-1$$

$$w_{K_\Pi+k} = v_k^{(1)}, \text{ for } k=0,\ldots,K_\Pi-1$$

$$w_{2K_\Pi+k} = V_k^{(2)}, \text{ for } k=0,\ldots,K_\Pi-1$$

If the payload is for PDCCH, the length of the circular buffer is reduced by one or more bits to:

$$K_w = 3K_\Pi - n,$$

where n represents the number of bits removed from the circular buffer 260.

Denoting by E the rate matching output sequence length, the rate matching output bit sequence is $e_k$, k=0, 1, ..., E−1. The output sequence $e_k$ is generated as follows by the rate matching circuit 262:

```
Set k = 0 and j = 0
while { k < E }
    if w_{j mod K_w} ≠ < NULL >
        e_k = w_{j mod K_w}
        k = k +1
    end if
    j = j +1
end while
```

In a second embodiment of the present invention, the circular buffer length is first determined by the bit collection circuit 258 as follows:

$$K_w = 3K_\Pi - n, \text{ for PDCCH payload, and}$$

$$K_w = 3K_\Pi, \text{ otherwise.}$$

The circular buffer is then generated by the bit collection circuit 258 as follows as follows:

$$w_k = v_k^{(0)} \text{ for } k=0, \ldots, K_\Pi - 1$$

$$w_{K_\Pi + k} = v_k^{(1)} \text{ for } k=0, \ldots, K_\Pi - 1$$

$$w_{2K_\Pi + k} = v_k^{(2)} \text{ for } k=0, \ldots, K_\Pi - (1+n) \text{ for PDCCH payload, and for } k=0, \ldots, K_\Pi - 1, \text{ otherwise.}$$

The output sequence $e_k$ is generated by the rate matching circuit 262 in the same manner as previously described.

In a third embodiment of the present invention, a circular buffer of length $K_w = 3K_\Pi - n$ is used for all LTE convolutionally encoded signals, where n is the number of coded bits deleted from the coded bit sequence. The circular buffer 260 is then generated as follows:

$$w_k = v_k^{(0)} \text{ for } k=0, \ldots, K_\Pi - 1$$

$$w_{K_\Pi + k} = v_k^{(1)} \text{ for } k=0, \ldots, K_\Pi - 1$$

$$w_{2K_\Pi + k} = v_k^{(2)} \text{ for } k=0, \ldots, K_\Pi - (1+n)$$

The output sequence is generated as follows by the rate matching circuit 262: The output sequence $e_k$ is generated by the rate matching circuit 262 in the same manner as previously described.

Figure 4:
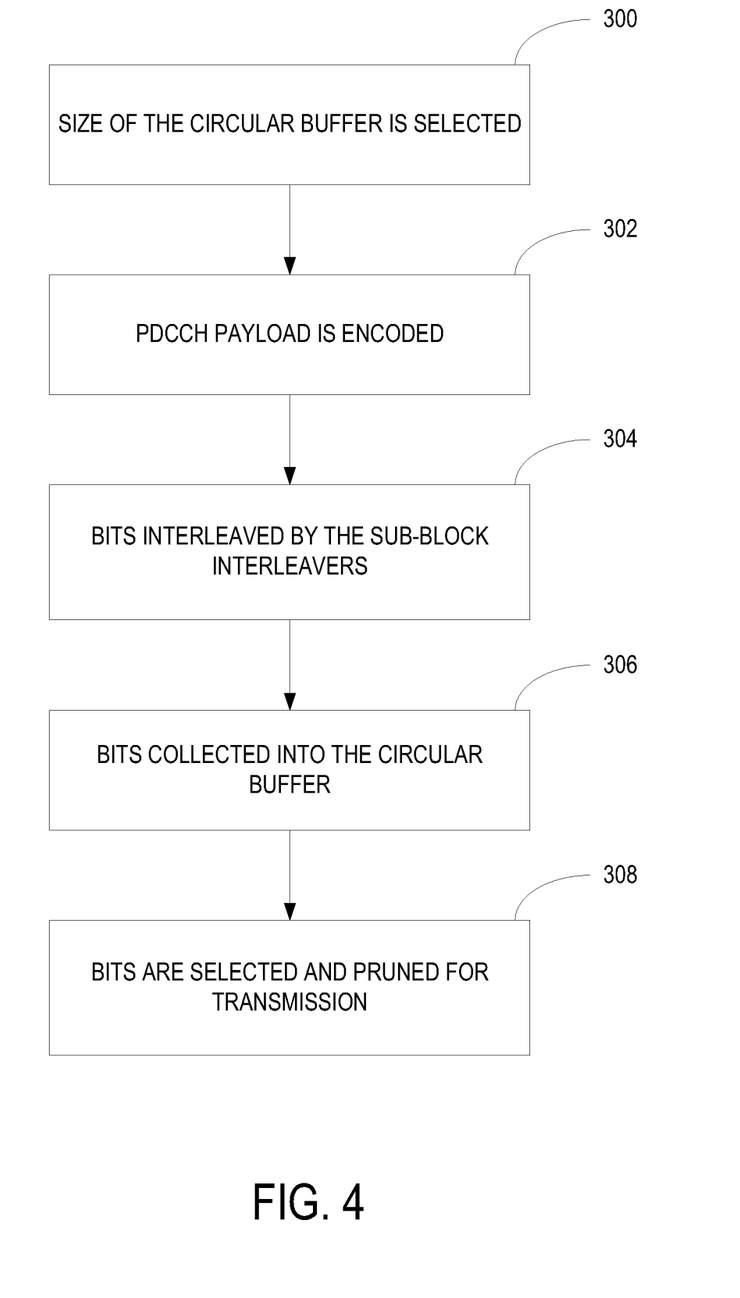
FIG. 4 is a flow chart illustrating an exemplary method of avoiding PDCCH detection errors according to one embodiment.

FIG. 4 is a flow chart illustrating the steps of removing PDCCH detection errors in a LTE telecommunications system according to one embodiment of the present invention. The method begins in step 300 where the size of the circular buffer 260 is selected such that no aggregation level confusion may arise. This may be accomplished by excluding one or more coded bits from the circular buffer 260, either by removing the coded bits from the circular buffer 260 after bit collection (first embodiment), or by deleting the coded bits before or during the bit collection (second and third embodiments). The excluded bits may be the last n coded bits, more than one excluded bit, or another coded bit of the payload. Next, in step 302, the PDCCH payload is encoded by a rate 1/3 tail-biting convolutional code by the encoder 252. In step 304, the bits are then interleaved by the sub-block interleavers 256. Next, in step 306, the bits are collected by the bit collection circuit 258 into the modified circular buffer 260. In step 308, the bits are selected and pruned for transmission by the rate matching circuit 262.

In other embodiments of the invention, the number of bits in the circular buffer 260 can be greater than the number of coded output bits and one or more extra bits can be added to the coded bit sequence. In this embodiment, the circular buffer 260 of length $K_w = 3K_\Pi$ is generated as follows:

$$w_k = v_k^{(0)} \text{ for } k=0, \ldots, K_\Pi - 1$$

$$w_{K_\Pi + k} = v_k^{(1)} \text{ for } k=0, \ldots, K_\Pi - 1$$

$$w_{2K_\Pi + k} = v_k^{(2)} \text{ for } k=0, \ldots, K_\Pi - 1$$

If the payload is for PDCCH, the length of the circular buffer 260 is increased by one $K_w = 3K_\Pi + 1$ and setting the additional bit to $w_{3K_\Pi} = x$. The extra bit x can be an additional coded bit, e.g., $x = v_0^{(0)}$. In other embodiments the extra bit x can be a source bit, e.g., $x = d_0^{(0)}$. In still other embodiments, a known bit, e.g., "0" bit, can be added. When a tail-biting convolutional code is used, the extra bit x can be a specific bit in the representation of the initial state of the tail-biting convolutional encoder 252.

Figure 5:
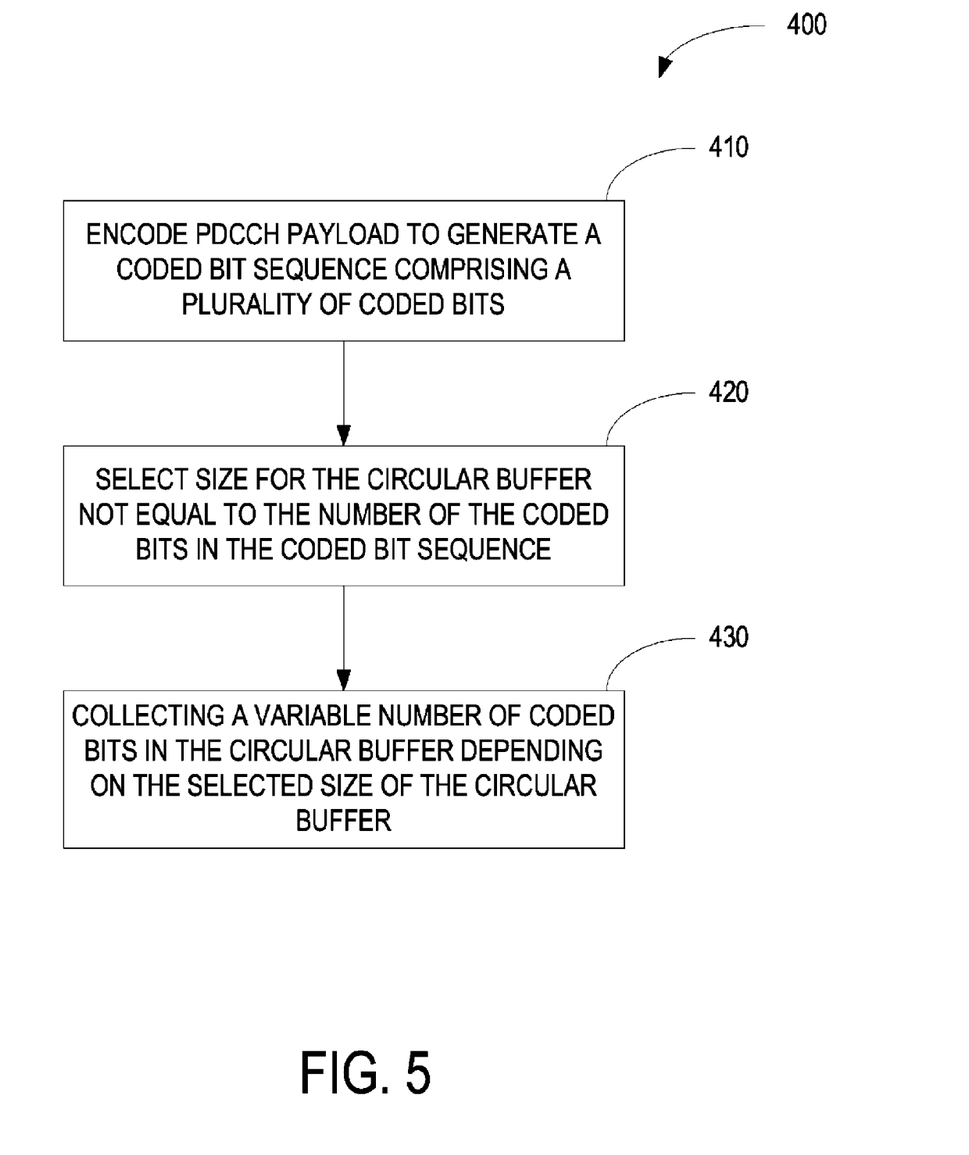
FIG. 5 is a flow chart illustrating an exemplary method of avoided PDCCH detection errors according to another embodiment.

FIG. 5 illustrates a method 400 of avoiding PDDCH detection errors according to another embodiment. A PDCCH payload is encoded to generate a coded bit sequence comprising a plurality of coded bits (step 410). The size of a circular buffer 260 is selected that is not equal to the number of bits in the coded bit sequence so as to avoid repetition of the coded bits in consecutive subsets of the CCEs allocated to the PDCCH (step 420). A variable number of coded bits is then collected in the circular buffer 260 depending on the selected size of the circular buffer 260 (step 430).

The present invention provides several distinct advantages over existing systems. The invention provides a universal solution to the PDCCH detection reliability problem. In addition, the present invention provides a relatively simple method and system of detecting and removing PDCCH detection errors without unduly adding complexity to the telecommunications system.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of unambiguous encoding of a Physical Downlink Control Channel (PDCCH) in a Long Term Evolution (LTE) telecommunications system, the method comprising the steps of:
    encoding the PDCCH payload to generate a coded bit sequence comprising a plurality of coded bits for transmission over a wireless channel to a remote communication device;
    selecting a size for a circular buffer that collects the coded bits, wherein the selected size is not equal to the number of coded bits in the coded bit sequence so that the coded bit sequence is not repeated in consecutive subsets of control channel elements allocated to the PDCCH; and
    collecting a variable number of coded bits collected in the circular buffer depending on the size of the circular buffer.

2. The method of claim 1 wherein selecting the size of the circular buffer comprises selecting a size less than the number of bits in the coded bit sequence.

3. The method of claim 2 wherein collecting the variable number of coded bits collected in the circular buffer comprises deleting one or more coded bits from the coded bit sequence.

4. The method of claim 3 wherein deleting one or more coded bits from the code bit sequence comprises deleting one or more source bits.

5. The method of claim 1 wherein selecting the size of the circular buffer comprises selecting a size greater than the number of bits in the coded bit sequence, and wherein collecting the variable number of coded bits collected in the circular buffer comprises adding one or more extra bits to the coded bit sequence.

6. The method of claim 5 wherein adding one or more extra bits to the coded bit sequence comprises repeating one or more coded bits in the coded bit sequence.

7. The method of claim 6 wherein repeating one coded bits in the coded bit sequence comprises repeating one or more source bits in the coded bit sequence.

8. The method of claim 5 wherein adding one or more extra bits to the coded bit sequence comprises adding one or more known bits to the coded bit sequence.

9. The method of claim 5 wherein adding one or more extra bits to the coded bit sequence comprises adding one or more state bits from a starting or ending state of the encoder.

10. A node for transmitting an unambiguously encoded Physical Downlink Control Channel (PDCCH) channel in a Long Term Evolution (LTE) telecommunications system, the node comprising:
   an encoder configured to encode a PDCCH payload with a channel code to generate a coded bit sequence comprising a plurality of coded bits for transmission over a wireless channel to a remote communication device;
   a bit collection circuit including a circular buffer configured to collect the coded bits, said bit collection circuit being configured to:
      select a size of the circular buffer not equal to the number of coded bits in the coded bit sequence so that the coded bit sequence is not repeated in consecutive subsets of control channel elements allocated to the PDCCH; and
      collecting a variable number of bits collected in the circular buffer depending on the selected size of the circular buffer.

11. The node of claim 10 wherein the bit collection circuit is configured to select a buffer size less than the number of coded bits in the coded bit sequence.

12. The node of claim 11 wherein the bit collection circuit is configured to delete one or more coded bits from the coded bit sequence to vary the number of bits collected in the circular buffer.

13. The node of claim 12 wherein the bit collection circuit is configured to delete one or more source bits from the coded bit sequence to vary the number of bits collected in the circular buffer.

14. The node of claim 10 wherein the bit collection circuit is configured to select a buffer size greater than the number of coded bits in the coded bit sequence and to add one or more extra bits to the coded bit sequence to vary the number of bits collected in the circular buffer.

15. The node of claim 14 wherein the bit collection circuit is configured to repeat one or more coded bits in the coded bit sequence to vary the number of bits collected in the circular buffer.

16. The node of claim 14 wherein the bit collection circuit is configured to repeat one or more source bits in the coded bit sequence to vary the number of bits collected in the circular buffer.

17. The node of claim 14 wherein the bit collection circuit is configured to add one or more known bits to the coded bit sequence to vary the number of bits collected in the circular buffer.

18. The node of claim 14 wherein the bit collection circuit is configured to add one or more state bits from a starting or ending state of the encoder to vary the number of bits collected in the circular buffer.

* * * * *

UNITED STATES PATENT AND TRADEMARK OFFICE
CERTIFICATE OF CORRECTION

PATENT NO. : 8,780,930 B2  
APPLICATION NO. : 13/472389  
DATED : July 15, 2014  
INVENTOR(S) : Cheng Page 1 of 1

It is certified that error appears in the above-identified patent and that said Letters Patent is hereby corrected as shown below:

In the Specification

In Column 6, Line 2, delete "$v_k^{(2)}$ .into" and insert -- $v_k^{(2)}$ into --, therefor.

In Column 7, Line 14, delete "$w_{2K_{\Pi}+k} v_k^{(2)}$" and insert -- $w_{2K_{\Pi}+k} = v_k^{(2)}$ --, therefor.

Signed and Sealed this  
Twenty-first Day of October, 2014

Michelle K. Lee  
*Deputy Director of the United States Patent and Trademark Office*